United States Patent
Hakola et al.

(10) Patent No.: US 11,445,436 B2
(45) Date of Patent: Sep. 13, 2022

(54) CELL SELECTION AND RESOURCE ALLOCATION THRESHOLDS

(71) Applicant: Nokia Technologies Oy, Espoo (FI)

(72) Inventors: Sami Hakola, Kempele (FI); Jorma Kaikkonen, Oulu (FI); Emad Farag, Flanders, NJ (US)

(73) Assignees: NOKIA OF AMERICA CORPORATION, Murray Hill, NJ (US); NOKIA TECHNOLOGIES OY, Espoo (FI)

( * ) Notice: Subject to any disclaimer, the term of this patent is extended or adjusted under 35 U.S.C. 154(b) by 18 days.

(21) Appl. No.: 16/645,688

(22) PCT Filed: Aug. 29, 2018

(86) PCT No.: PCT/IB2018/056599
§ 371 (c)(1),
(2) Date: Mar. 9, 2020

(87) PCT Pub. No.: WO2019/048992
PCT Pub. Date: Mar. 14, 2019

(65) Prior Publication Data
US 2020/0280912 A1    Sep. 3, 2020

Related U.S. Application Data

(60) Provisional application No. 62/556,814, filed on Sep. 11, 2017.

(51) Int. Cl.
*H04W 48/20* (2009.01)
*H04B 7/06* (2006.01)
(Continued)

(52) U.S. Cl.
CPC .......... *H04W 48/20* (2013.01); *H04B 7/0695* (2013.01); *H04W 24/10* (2013.01);
(Continued)

(58) Field of Classification Search
CPC ... H04W 48/20; H04W 24/10; H04W 56/001; H04W 72/046; H04W 74/0833; H04B 7/0695; H04B 7/0639
See application file for complete search history.

(56) References Cited

U.S. PATENT DOCUMENTS 10,945,225 B2 * 3/2021 Ohara ................ H04W 56/001
2015/0382205 A1  12/2015 Lee et al.
(Continued)

FOREIGN PATENT DOCUMENTS

WO         2016/210302 A1    12/2016

OTHER PUBLICATIONS

International Search Report and Written Opinion received for corresponding Patent Cooperation Treaty Application No. PCT/IB2018/056599, dated Nov. 21, 2018, 15 pages.
(Continued)

*Primary Examiner* — Habte Mered
(74) *Attorney, Agent, or Firm* — Squire Patton Boggs (US) LLP

(57) ABSTRACT

Various communication systems may benefit from improved cell selection. For example, it may be helpful to improve cell selection in new radio systems based on individual synchronization signal blocks meeting specific thresholds. A method may include measuring at a user equipment a cell quality of one or more cells. The method may also include detecting at the user equipment synchronization signal blocks in the one or more cells. In addition, the method may include determining at the user equipment that the synchronization signal blocks do not meet a random access channel resource selection threshold. Further, the method may include selecting at the user equipment only random access channel resources that correspond to the synchronization signal blocks meeting a cell selection threshold.

20 Claims, 4 Drawing Sheets

(51) Int. Cl.
*H04W 24/10* (2009.01)
*H04W 56/00* (2009.01)
*H04W 72/04* (2009.01)
*H04W 74/08* (2009.01)

(52) U.S. Cl.
CPC ....... *H04W 56/001* (2013.01); *H04W 72/046* (2013.01); *H04W 74/0833* (2013.01)

(56) References Cited

U.S. PATENT DOCUMENTS

2019/0037605 A1* 1/2019 Agiwal ................ H04W 24/10
2019/0215743 A1* 7/2019 Liu .................. H04W 36/0088
2019/0349830 A1* 11/2019 Peisa .................... H04B 7/0413

OTHER PUBLICATIONS

"Beam selection during handover", 3GPP TSG-RAN WG2 #99, R2-1708875, Agenda : 10.2.7, Huawei, Aug. 21-25, 2017, 4 pages.
"RACH Procedures for Unified Single and Multiple Beam Based Access", 3GPP TSG RAN WG1 Meeting #87, R1-1611669, Agenda : 7.1.2.5, Huawei, Nov. 14-18, 2016, pp. 1-5.

* cited by examiner

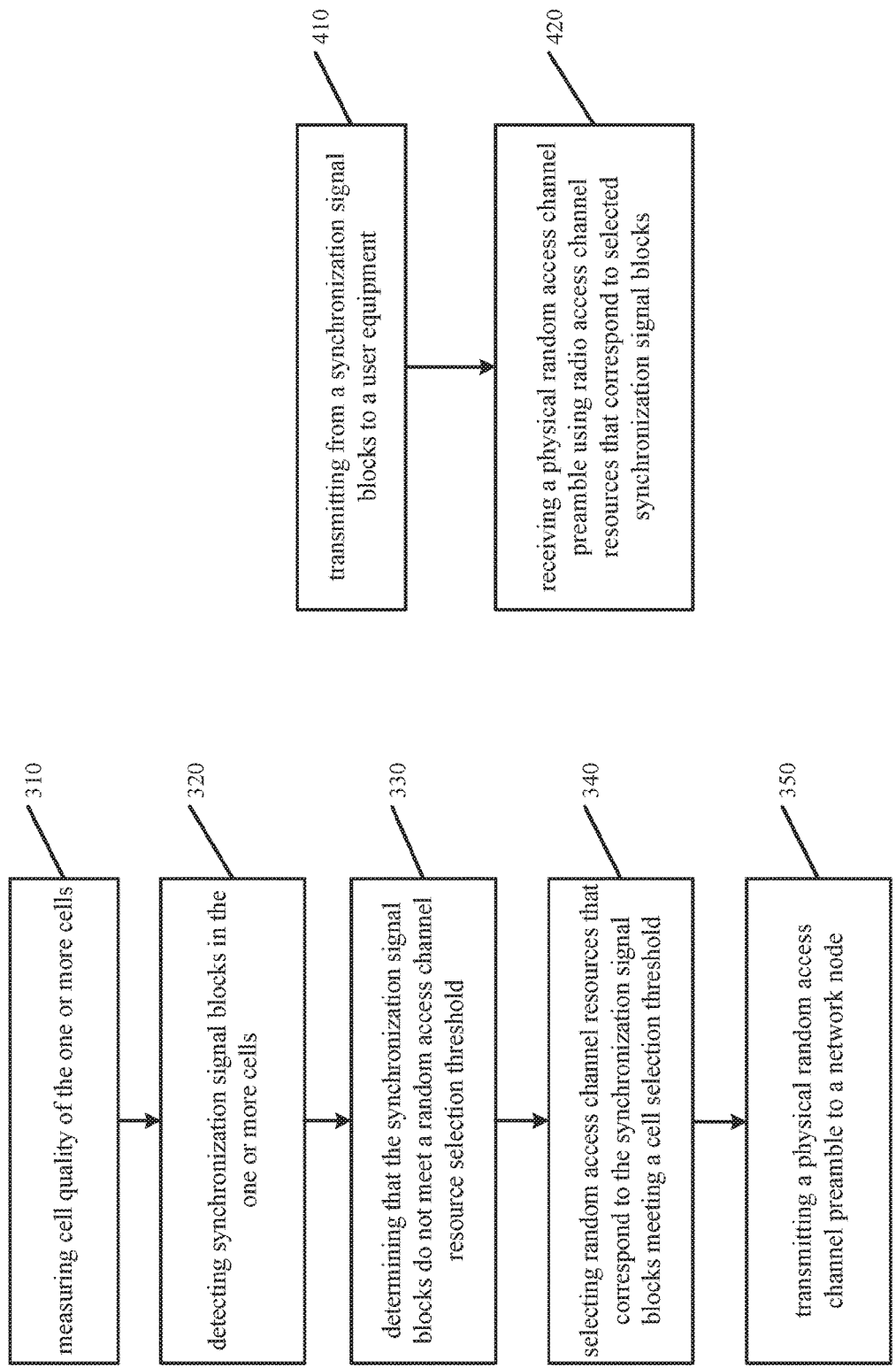

CELL SELECTION AND RESOURCE ALLOCATION THRESHOLDS

RELATED APPLICATION

This application claims priority to PCT Application No. PCT/IB2018/056599, filed on Aug. 29, 2018, which claims priority to U.S. Provisional Application No. 62/556,814, filed on Sep. 11, 2017, each of which is incorporated herein by reference in its entirety.

BACKGROUND

Field

Various communication systems may benefit from improved cell selection. For example, it may be helpful to improve cell selection in new radio systems based on individual synchronization signal blocks meeting specific thresholds.

Description of the Related Art

Third generation partnership project (3GPP) technology, such as fifth generation (5G) and New Radio (NR) technology, is being developed in order to achieve a single technical framework addressing all usage scenario, requirements, and deployment. In particular, the 3GPP NR physical layer has been designed for an NR NodeB (gNB), to operate using sector wide, single-beam or to operate using a more narrow beam, such as a multi-beam, for common control transmission and reception. The common control transmission may include a synchronization signal (SS) block, NR-primary synchronization signal (PSS), NR-secondary synchronization signal (SSS), and NR-physical broadcast channel (PBCH), remaining minimum system information (RMSI), other system information (OSI) that is not included as part of the RMSI, or paging transmissions, while common control reception may include a random access channel (RACH).

In multi-beam configuration, the gNB transmits multiple SS blocks each with a different transmission beam on a predefined time domain position. RACH resources are associated with the SS blocks in a manner which allows the user equipment to signal using the physical RACH (PRACH) preamble to select the preferred downlink transmission beam or SS block. The user equipment may them transmit the PRACH preamble at the time the gNB is using a good reception beam for the user equipment. In other words, PRACH resources in time domain can be associated with time domain SS block positions, and the user equipment selects PRACH resources that correspond to a preferable SS block. The determination of whether the PRACH resources are good can be based on a measured reference signal received power (RSRP) of the SS blocks.

The user equipment may select the SS blocks and corresponding PRACH resources for path-loss estimation and retransmission based on one or more SS blocks satisfying one or more thresholds. If the user equipment does not detect a SS block that satisfies thresholds, the user equipment may select any SS block that allows the user equipment to meet the target received power of the RACH preamble with its maximum transmission power. The user equipment also has the flexibility to select its receiver beam to find the list of SS blocks that satisfy the threshold.

The cell quality may be derived by averaging the best beam with the up to N−1 best beams that are above an absolute configured threshold, with N being the total number of SS block. For example, if N is configured to be 4, the user equipment averages the SS block RSRP measurement of the best beam with the RSRP measurement of the 3 next best beams that are above a certain threshold.

BRIEF DESCRIPTION OF THE DRAWINGS

For proper understanding of the invention, reference should be made to the accompanying drawings, wherein:

FIG. 3 illustrates a method flow diagram according to certain embodiments.

FIG. 4 illustrates a method flow diagram according to certain embodiments.

DETAILED DESCRIPTION

Certain embodiments may allow for determining at the user equipment that the synchronization signal blocks do not meet a RACH resource selection threshold. The user equipment may then select only those RACH resources that correspond to the synchronization signal blocks meeting a cell selection threshold. In other words, the user equipment behavior and/or functionality may be restricted so that the chosen set of RACH resources are only those that correspond to SS blocks that meet a cell selection threshold.

Figure 1:
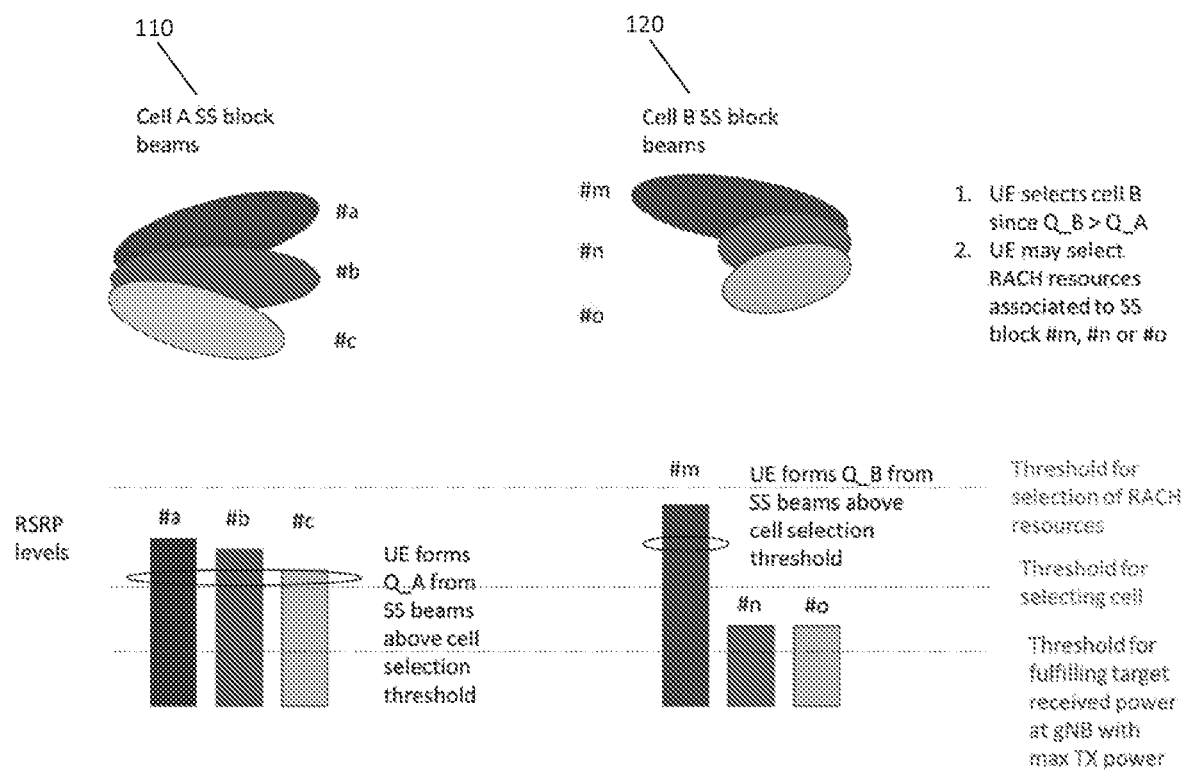
FIG. 1 illustrates cell selection according to certain embodiments.

FIG. 1 illustrates cell selection according to certain embodiments. In particular, FIG. 1 illustrates Cell A 110 having SS blocks #a, #b, and #c, and Cell B 120 having SS blocks #m, #n, and #o. All of the SS blocks in cell A and cell B may fulfill the low threshold for target received power at the gNB with a max transmission power. SS blocks #a, #b, and #c may all have an RSRP level that is above the selecting cell threshold, while only SS block #111 in cell B meets the selecting cell threshold. None of the SS blocks in either cell A or cell B meet the threshold for selection of RACH resources.

As can be seen in FIG. 1, the RSRP level of SS block #111 is higher than any of the RSRP levels of the SS blocks in cell A 110. In certain embodiments, the quality of cell B 120 may be higher than the quality of cell A 110, due to the high RSRP level associated with SS block #m. Even though the RSRP levels of the SS blocks in cell A 110 are higher than the RSRP levels of #n and #o in cell B 120, the user equipment may still select RACH resources associated with cell B 120. In other words, the user equipment may select RACH resources associated with SS block #n or #0, even though they may have worse RSRP levels than any of the SS blocks in cell A.

Such a selection of SS blocks may result in contradictory behavior compared to the IDLE mode cell selection or reselection. The cell quality determination may include N cells that exceed a certain threshold, which may be configured by the network. If the user equipment selects #n or #o, the end result could be that user equipment performs RACH to SS blocks that may not correspond to the cell quality assumed in the cell selection or reselection. In other words, as shown in FIG. 1, the perceived RSRP, for example, would be better in any of the SS blocks observed from Cell A, as opposed to those observed by Cell B.

In certain embodiments, the selection of RACH resources by the user equipment may be restricted. For example, if the user equipment does not detect a SS block that satisfies the RACH resource threshold, also known as the RACH resource selection or reselection threshold, the user equipment may only select RACH resource in the selected cell that fulfills or meets the cell selection threshold. The user equipment may select RACH resources and a corresponding SS block, which may be used as a downlink transmission beam. In some embodiments, the RACH resource threshold may equal or be the same as the cell selection threshold. The user equipment may only select RACH resources associated with SS blocks that meet the cell selection threshold. The cell selection threshold may be based on the quality on at least one of the synchronization signal blocks or a channel state information reference signal.

In certain embodiments, the threshold may be absolute, for example an RSRP of −80 decibel-milliwatts (dBm), or the threshold may be relative, for example X dBm below the strongest SS. In addition, if the user equipment does not detect a SS block that satisfies a given threshold, the user equipment may have the flexibility to select any SS block that allows the user equipment to meet the target received power of the RACH preamble with its maximum transmit power. In other words, if none of the SS blocks corresponding to RACH resources meet the threshold, the user equipment may make a selection purely based on the user equipment transmitter power margin.

The cell selection threshold, in some embodiments, may be the threshold used, at least in part, to determine whether the cell or the SS block is a valid candidate for cell selection or reselection. In other embodiments, the cell selection threshold may be used to determine whether a given SS block may be included as part of the determination of the cell quality.

The system, in certain embodiments, may include or configure an additional reception threshold for SS block based transmission, such as a downlink transmission to the user equipment. The additional reception threshold may be a relative threshold, as discussed above. After performing cell selection, the user equipment may restrict the RACH resource selection to include only those RACH resources that are associated with the SS blocks that meet the additional reception threshold. In other embodiments, the user equipment may use only one of the SS blocks which have been used for determination of the cell quality.

Figure 2:
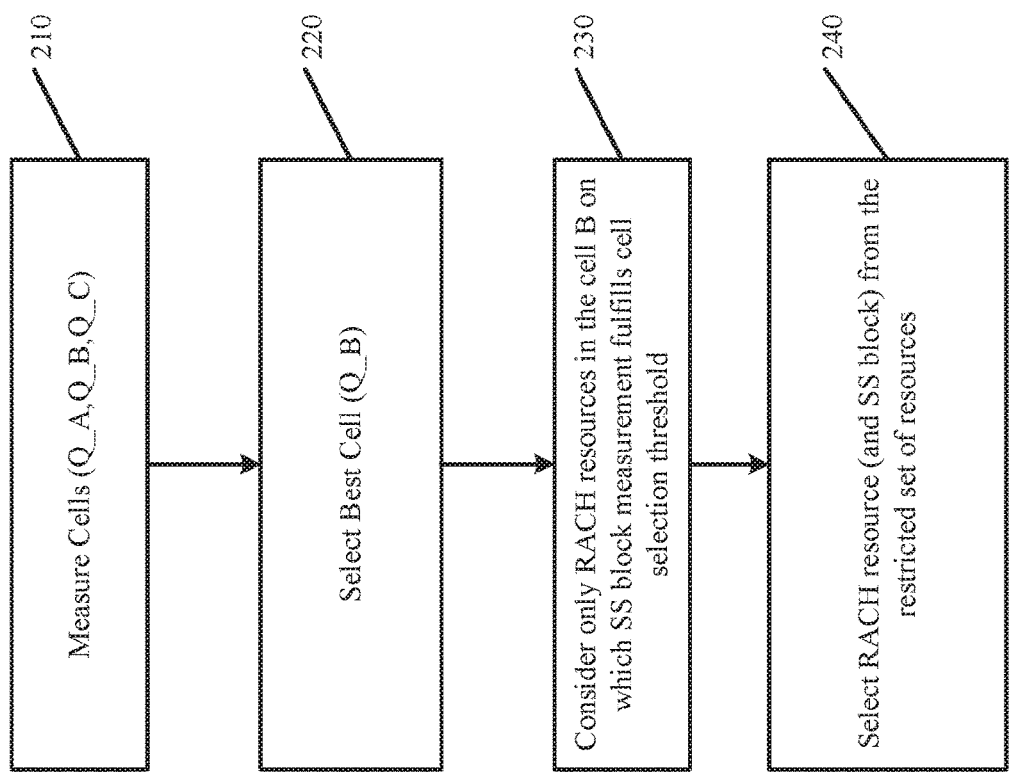
FIG. 2 illustrates a method flow diagram according to certain embodiments.

FIG. 2 illustrates a method flow diagram according to certain embodiments. In particular, FIG. 2 illustrates user equipment behavior in an environment that includes three cells, cell A, cell B, and cell C. The user equipment may measure multiple SS blocks per cell. As shown in step 210 in FIG. 2, the cell may measure the quality of the cells (Q_X) for each of cells A, B, and C. The user equipment may use one or multiple SS blocks per cell to make the quality of cell measurements. In step 220, the user equipment may select the best cell, which may be for example Q_B. The SS blocks associated with cell B may not meet the RACH resource threshold. The user equipment may then consider only RACH resources associated with selected cell B in which the SS block measurement meets or fulfills a cell selection threshold, as shown in step 230.

In step 240, the user equipment may select RACH resource and/or SS blocks from the restricted set of resources. The user equipment may transmit a RACH preamble to a network node, for example a gNB, using the selected RACH resource to inform the gNB of the corresponding SS block. The RACH preamble transmitted by the user equipment may therefore signal to the gNB the selected downlink transmission beam.

As discussed above, in certain embodiments the system or cell may configure a reception quality threshold for the SS block based transmission, such as a physical downlink control channel (PDCCH) scheduling the physical data shared channel (PDSCH) carrying at least one of random access response (RAR), RMSI, or some other common control transmission. The user equipment, after selecting the cell may restrict the RACH resources to include only those resources that meet the reception quality threshold. The reception quality threshold may be a different kind of measure than the cell selection threshold.

FIG. 3 illustrates an example of a method flow diagram according to certain embodiments. In particular, FIG. 3 illustrates a method performed by a user equipment, which may be similar to the method performed by the user equipment in FIG. 2. In fact, the method of FIG. 2 may be a particular embodiment of the method illustrated in FIG. 3. In step 310, the user equipment may include measuring at a user equipment a cell quality of one or more cells. In step 320, the user equipment may detect SS blocks in the one or more cells. The user equipment may then measure a quality of the SS blocks in the one or more cells. The user equipment may then select one or more cells based on the quality of the one or more cells. The measured quality may be the RSRP of the one or more cells of the SS blocks. The cell selection threshold may be based on the quality on at least one of the synchronization signal blocks or a channel state information reference signal.

The user equipment may determine that the SS blocks do not meet a RACH resource selection threshold, as shown in step 330. In step 340, the user equipment may select only RACH resources that correspond to the SS blocks meeting a cell selection threshold. The user equipment may select only one of the SS blocks that has been used to determine the quality of the one or more cells. The corresponding SS blocks may be used to indicate to the network node a downlink transmission beam.

In certain embodiments, the RACH resource selection threshold may equal the cell selection threshold. In some other embodiments, the RACH resource selection threshold and the cell selection threshold may be substantially the same, or the RACH resource selection threshold may be within an offset of the cell selection threshold. In other words, a value of the offset may be insignificant, such as within a small range, under a maximum value, or up to a certain percentage. If the RACH resource selection threshold and the cell selection threshold are the same, the network may program the thresholds to be the same. If the RACH resource selection threshold and the cell selection threshold are substantially the same or substantially equal, the network may program these threshold values independently to be close to each other. The cell selection threshold, in some embodiments, may determine whether one of the one or more cells or the SS blocks are valid candidates for cell selection or cell reselection. Yet in other embodiments, the cell selection threshold may be used to determine whether one of the SS blocks are to be included in a determination of the cell quality of one or more cells.

In another embodiment, the reception quality threshold may be configured for the SS block based transmission. The selected RACH resources may be associated with the reception quality threshold. The reception quality threshold may not be equal to the cell selection threshold. In step 350, the user equipment may transmit a physical random access channel preamble to a network node, such as a gNB, using the RACH resources that correspond to the SS blocks that meet the cell selection threshold. The physical RACH preamble may indicate to the network node a preferred downlink transmission beam.

FIG. 4 illustrates an example of a method flow diagram according to certain embodiments. In particular, FIG. 4 illustrates a method according to a network node, for example a gNB, which may be used in a network along with the method performed by the user equipment, as illustrated in FIGS. 2 and 3. In step 410, the network node may transmit synchronization signal blocks to a user equipment. In step 420, the network node receives from a user equipment a physical RACH preamble using RACH resources that correspond to selected SS blocks. The SS blocks do not meet a RACH resource selection threshold and meet a cell selection threshold. The physical random access channel preamble may indicate to the network node at least one preferred downlink transmission beam.

Figure 5:
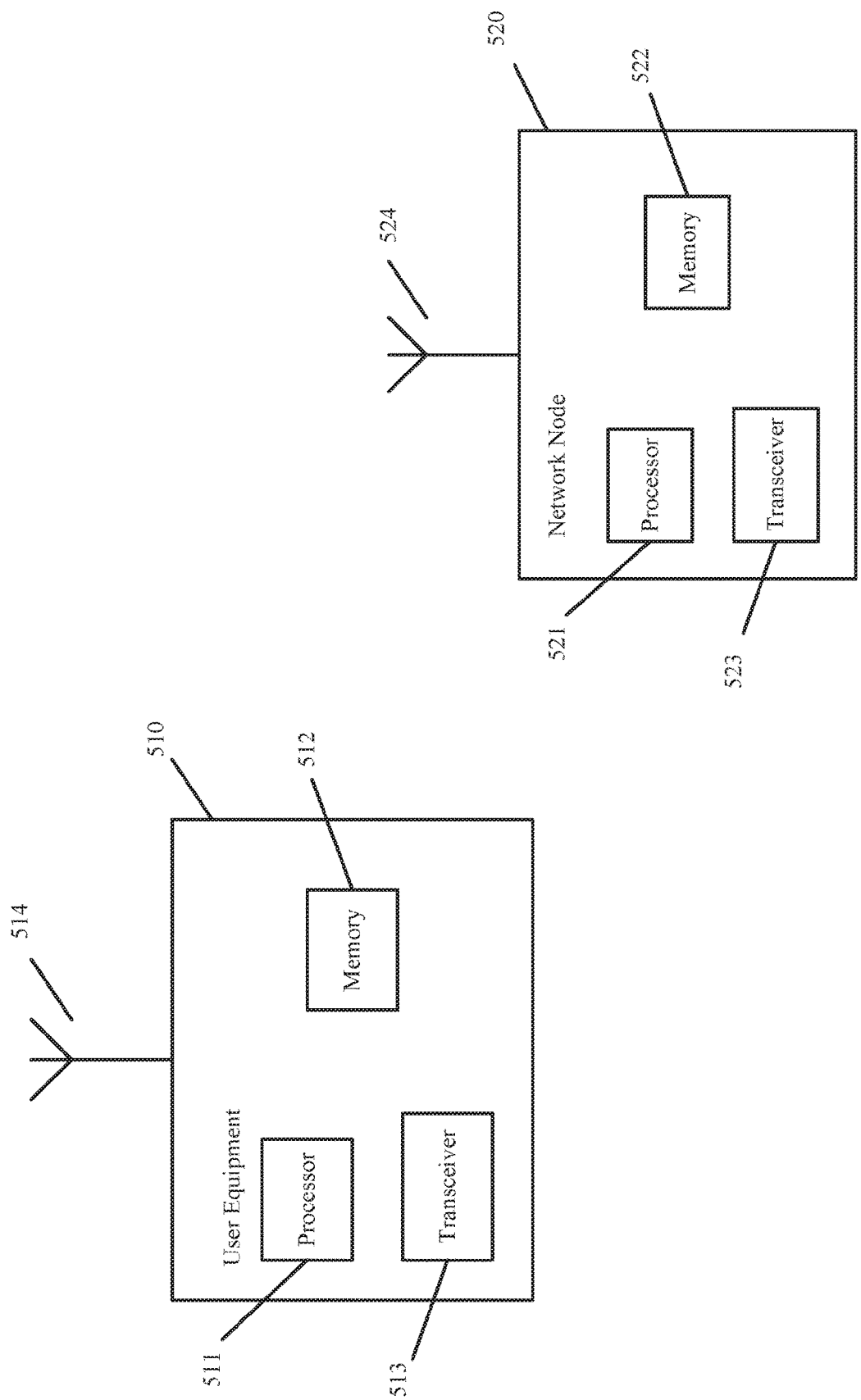
FIG. 5 illustrates a system according to certain embodiments.

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, a network node 520 or user equipment (UE) 510. The system may include more than one UE 510 and more than one network node 520. Network node 520, may be a base station, an access point, an access node, a gNB, a 5G NB, a server, a host, or any other network core entity that may communicate with the UE.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network node 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or a UE 510, may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network node, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

The above embodiments may provide for significant improvements to the functioning of a network and/or to the functioning of the network entities within the network, or the user equipment communicating with the network. For example, the above embodiments may restrict user equipment functioning to those RACH resources that meet a cell selection threshold. This may help to ensure the high quality of the SS blocks selected by the user equipment, thereby improving the quality of the downlink transmission beam.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 3GPP NR and 5G technology, the above embodiments may also apply to any other present or future 3GPP technology, such as IoT technology, Long Term Evolution (LTE), LTE-advanced, and/or fourth generation (4G) technology.

Partial Glossary
PDCCH Physical Downlink Control Channel
PDSCH Physical Downlink Shared Channel
RACH Random Access Channel
RAR Random Access Response
RMSI Remaining Minimum System Information
SS Synchronization Signal
UE User Equipment According to a first embodiment, a method may include measuring at a user equipment a cell quality of one or more cells. The method may also include detecting at the user equipment synchronization signal blocks in the one or more cells. In addition, the method may include determining at the user equipment that the synchronization signal blocks do not meet a random access channel resource selection threshold. Further, the method may include selecting at the user equipment only random access channel resources that correspond to the synchronization signal blocks meeting a cell selection threshold.

In a variant, the random access channel resource selection threshold may equal the cell selection threshold. In another variant, the random access channel resource selection threshold and the cell selection threshold may be substantially the same, or the random access channel resource selection threshold may be within an offset of the cell selection threshold. A value of the offset can be insignificant, such as within a small range, under a maximum value, or up to a certain percentage.

In a further variant, the method may include the user equipment transmitting a physical random access channel preamble to a network node using the random access channel resources that meet the cell selection threshold.

In a variant, the cell selection threshold may be based on the quality on at least one of the synchronization signal blocks or a channel state information reference signal.

In another variant, the physical random access channel preamble may indicate to the network node at least one preferred downlink transmission beam.

In an additional variant, the corresponding synchronization signal blocks may be used to indicate a downlink transmission beam.

In another variant, the cell selection threshold may determine whether one of the one or more cells or the synchronization signal blocks are valid candidates for cell selection or cell reselection.

In a further variant, the cell selection threshold may be used to determine whether one of the synchronization signal blocks are to be included in a determination of the cell quality of one or more cells.

In a variant, the method may include selecting at the user equipment one of the one or more cells based on the quality of the one or more cells.

In another variant, the method may include selecting by the user equipment only one of the synchronization signal blocks that has been used to determine the quality of the one or more cells.

In an additional variant, the method may include configuring a reception quality threshold for the synchronization signal block based transmission. The selected random access channel resources may be associated with the reception quality threshold.

In some variant, the reception quality threshold may not be equal to the cell selection threshold.

In a further variant, the method may include measuring by the user equipment the synchronization selection blocks in the one or more cells.

According to a second embodiment, a method may include transmitting from a network node synchronization signal blocks to a user equipment. The method may also include receiving a physical random access channel preamble at the network node from the user equipment using random access channel resources that correspond to selected synchronization signal blocks. The selected synchronization signal blocks do not meet a random access channel resource selection threshold, but meet a cell selection threshold.

In a variant, the random access channel resource selection threshold may equal the cell selection threshold. In another variant, the random access channel resource selection threshold and the cell selection threshold may be substantially the same, or the random access channel resource selection threshold may be within an offset of the cell selection threshold. A value of the offset may be insignificant, such as within a small range, under a maximum value, or up to a certain percentage.

In another variant, the physical random access channel preamble may indicate to the network node at least one preferred downlink transmission beam.

In an additional variant, the cell selection threshold may determine whether one of the one or more cells or the synchronization signal blocks are valid candidates for cell selection or cell reselection.

In a variant, the cell selection threshold may be based on the quality on at least one of the synchronization signal blocks or a channel state information reference signal.

In a further variant, the cell selection threshold may be used to determine whether one of the synchronization signal blocks are to be included in a determination of the cell quality of one or more cells.

In an additional variant, the method may include configuring a reception quality threshold for the synchronization signal block based transmission. The selected random access channel resources may be associated with the reception quality threshold.

In some variant, the reception quality threshold may not be equal to the cell selection threshold.

According to a third and fourth embodiment, an apparatus can include at least one processor and at least one memory and computer program code. The at least one memory and the computer program code can be configured to, with the at least one processor, cause the apparatus at least to perform a method according to the first embodiment and the second embodiment, and any of its variants.

According a fifth and sixth embodiment, an apparatus can include means for performing the method according to the first embodiment and the second embodiment, and any of its variants.

According to a seventh and an eighth embodiment, a computer program product may encode instructions for performing a process including a method according to the first embodiment and the second embodiment, and any of its variants.

According to a ninth and a tenth embodiment, a non-transitory computer-readable medium may encode instructions that, when executed in hardware, perform a process including a method according to the first embodiment and the second embodiment, and any of its variants.

According to an eleventh and a twelve embodiment, a computer program code may include instructions for performing a method according to the first embodiment and the second embodiment, and any of its variants.

We claim:

1. An apparatus comprising:
   at least one processor; and
   at least one memory including computer program code;
   the at least one memory and the computer program code configured to, with the at least one processor, cause the apparatus at least to:
   measure a cell quality of one or more cells, wherein the cell quality of each cell of the one or more cells is based on averaging a quality of a plurality of the cell's best beams meeting a cell selection threshold;
   detect synchronization signal blocks in the one or more cells;
   select a best cell from the one or more cells based on the cell quality;
   determine that the synchronization signal blocks of the best cell do not meet a random access channel resource selection threshold; and
   select random access channel resources of the best cell that correspond to the synchronization signal blocks of the best cell meeting the cell selection threshold.

2. The apparatus as in claim 1, wherein the random access channel resource selection threshold is equal to the cell selection threshold.

3. The apparatus as in claim 1, wherein the random access channel resource selection threshold and the cell selection threshold are the same, or the random access channel resource selection threshold is within an offset of the cell selection threshold.

4. The apparatus as in claim 3, wherein a value of the offset is at least one of within a small range, under a maximum value, or up to a predetermined percentage.

5. The apparatus as in claim 1, wherein the at least one memory and the computer program code further configured to, with the at least one processor, cause the apparatus at least to transmit a physical random access channel preamble to a network node using the random access channel resources that meet the cell selection threshold.

6. The apparatus as in claim 5, wherein the physical random access channel preamble indicates to the network node at least one preferred downlink transmission beam.

7. The apparatus as in claim 1, wherein the cell selection threshold is based on quality of at least one of the synchronization signal blocks or a channel state information reference signal.

8. The apparatus as in claim 1, wherein the synchronization signal blocks are used to indicate a downlink transmission beam.

9. The apparatus as in claim 1, wherein the cell selection threshold determines whether one of the one or more cells or the synchronization signal blocks are valid candidates for cell selection or cell reselection.

10. The apparatus as in claim 1, wherein the cell selection threshold is used to determine whether one of the synchronization signal blocks are to be included in a determination of the cell quality of one or more cells.

11. The apparatus as in claim 1, wherein the at least one memory and the computer program code further configured to, with the at least one processor, cause the apparatus at least to select one of the one or more cells based on the quality of the one or more cells.

12. The apparatus as in claim 1, wherein the at least one memory and the computer program code further configured to, with the at least one processor, cause the apparatus at least to select one of the synchronization signal blocks that has been used to determine the quality of the one or more cells.

13. The apparatus as in claim 1, wherein the at least one memory and the computer program code configured to, with the at least one processor, cause the apparatus at least to configure a reception quality threshold for synchronization signal block based transmission.

14. The apparatus as in claim 13, wherein the selected random access channel resources are associated with the reception quality threshold.

15. The apparatus as in claim 13, wherein the reception quality threshold is not equal to the cell selection threshold.

16. The apparatus as in claim 1, wherein the at least one memory and the computer program code further configured to, with the at least one processor, cause the apparatus at least to measure the synchronization selection blocks in the one or more cells.

17. An apparatus comprising:
    at least one processor; and
    at least one memory including computer program code;
    the at least one memory and the computer program code configured to, with the at least one processor, cause the apparatus at least to
    transmit synchronization signal blocks to a user equipment; and
    receive a physical random access channel preamble using random access channel resources that correspond to selected synchronization signal blocks, wherein the selected synchronization signal blocks do not meet a random access channel resource selection threshold, but meet a cell selection threshold, wherein selection of the synchronization signal blocks is based on measured call quality of one or more cells, wherein the cell quality of each cell of the one or more cells is based on averaging a quality of a plurality of the cell's best beams meeting a cell selection threshold.

18. The apparatus as in claim 17, wherein the random access channel resource selection threshold is equal to the cell selection threshold.

19. The apparatus as in claim 17, wherein the physical random access channel preamble indicates at least one preferred downlink transmission beam.

20. A method comprising:
measuring, at a user equipment, a cell quality of one or more cells, wherein the cell quality of each cell of the one or more cells is based on averaging a quality of a plurality of the cell's best beams meeting a cell selection threshold;
detecting, at the user equipment, synchronization signal blocks in the one or more cells;
selecting a best cell from the one or more cells based on the cell quality;
determining that the synchronization signal blocks of the best cell do not meet a random access channel resource selection threshold; and
selecting random access channel resources of the best cell that correspond to the synchronization signal blocks of the best cell meeting the cell selection threshold.

* * * * *